United States Patent [19]

Feix

[11] 3,998,439
[45] Dec. 21, 1976

[54] APPARATUS FOR MIXING MATERIALS IN MOLDING MACHINES

[76] Inventor: Rudolf A. Feix, 131 Clark Ave., Greer, S.C. 29651

[22] Filed: Jan. 20, 1975

[21] Appl. No.: 542,363

[52] U.S. Cl. .............................. 259/192; 222/240
[51] Int. Cl.² ............................................. B29B 1/10
[58] Field of Search ................ 259/9, 10, 5, 6, 7, 259/8, 21, 25, 26, 40, 41, 42, 45, 46, 68, 69, 64, 65, 192; 425/207, 208, 209, 130; 222/235, 236, 240

[56] References Cited
UNITED STATES PATENTS

| | | | |
|---|---|---|---|
| 2,064,131 | 12/1936 | Tuscan | 259/10 |
| 2,176,528 | 10/1939 | Gilchrist | 222/235 |
| 2,382,655 | 8/1945 | Nichols | 425/130 |
| 3,164,860 | 1/1965 | Oxel | 425/209 |
| 3,476,523 | 11/1969 | Leybourne | 259/9 |

*Primary Examiner*—Robert W. Jenkins
*Attorney, Agent, or Firm*—Bailey, Dority & Flint

[57] ABSTRACT

This invention relates generally to plastic molding machines and more particularly to a mixing chamber connected to a main hopper which is fed by an auxiliary hopper for mixing the materials from the main hopper and auxiliary hopper together wherein the mixing chamber includes a rotatable shaft extending across the chamber, a pair of ring elements symmetrically carried by the shaft closely adjacent the interior surface of the mixing chamber for removing and cleaning materials therefrom, and a plurality of outwardly extending mixing arms carried by the shaft for mixing the materials together within the volume of the ring elements.

10 Claims, 5 Drawing Figures

APPARATUS FOR MIXING MATERIALS IN MOLDING MACHINES

BACKGROUND OF THE INVENTION

The conventional plastic molding machines, either of the extrusion or of the injection type, normally are fed from a main feed hopper which contains a mixture of a primary resinous material and a color concentrate or other additive material. The primary and additive materials are premixed by placing the two materials in a barrel which is then tumbled for mixing the materials together. Thereafter the mixed materials are loaded into the main feed hopper of the molding machine. However, as the mixture is allowed to stand in the main feed hopper, the color powder tends to sift to the bottom of the hopper through the bulkier and larger resinous granule materials causing inaccuracies in the coloring of the final product and waste of materials.

Buying bulk quantities of uncolored resinous plastic material and then blending in the color concentrate or color powder is desirable since a sizeable cost savings is afforded over buying resinous materials already colored. Therefore, a more efficient and accurate method and apparatus for mixing the primary resinous material with the additive coloring material needs to be provided. Prior devices have been developed for feeding a primary material and an additive from separate hoppers into a common chamber for mixing, such as in U.S. Pat. Nos. 3,164,860 and 2,382,655 wherein a primary molding material and an additive material are fed from separate hoppers to a conveying chamber and are mixed therein by mixing elements carried on the screw conveyors, or are otherwise caused to be mixed together by the screw conveyor itself.

Another device is shown in U.S. Pat. No. 2,442,368 wherein a frictional mixing chamber is provided below the main hopper for plasticizing the plastic material to be molded which also makes it possible to mix ingredients into the plastic material at the time of plasticizing thus avoiding premixing.

SUMMARY OF THE INVENTION

An apparatus for mixing different materials together in molding machines and the like is provided comprising a main feed hopper containing a primary molding material, an auxiliary hopper for feeding an additive material to the hopper, and a mixing chamber for mixing the primary and additive material together having an inlet opening connected to the main hopper and an outer outlet connected to a conveyor means which conveys the mixed materials away. A conveyor tube is carried by the auxiliary hopper and extends into the main hopper terminating adjacent the center of the main hopper directly above the inlet opening to the mixing chamber. The conveyor tube includes a conveyor member centrally located therein for conveying the additive material to the main hopper whereby the additive material flows directly into the mixing chamber together with the primary material for mixing therein. A mixing assembly, including a shaft extending across the mixing chamber is rotatably carried therein, and at least one ring element is carried by the shaft closely adjacent an interior surface of the mixing chamber so as to remove and clean the materials from the surface. A plurality of mixing arms is carried by the shaft for mixing the materials together within the volume defined by the ring elements as the ring elements and mixing arms are rotated by the shaft. The more dense and larger granules of the primary material become lodged in the small spacing between the ring element and the interior surface of the mixing chamber so as to agitate and clean off any of the finer additive material, such as color powder which may be adhered to the interior surface, thus providing a self-cleaning mixing chamber and a thorough blending of the two materials.

Accordingly, an important object of the present invention is to provide a mixing chamber for use with molding machines and the like which thoroughly and completely blends different materials together in a homogeneous manner.

Another important object of the present invention is to provide a mixing chamber for mixing different materials together which is self-cleaning.

Another important object Of the present invention is to provide an auxiliary feed hopper for use with a main feed hopper in molding machines and the like for feeding an additive material to the main feed hopper in such a manner that the additive material may feed with the primary material directly into a mixing chamber.

Another important object of the present invention is to provide an auxiliary feed hopper for feeding fine additive material to a main feed hopper wherein packing of the fine material in the hopper is eliminated.

Still another important object of the present invention is to provide a mixing assembly for use in a mixing chamber which thoroughly blends and mixes the materials together while removing material adhered to the interior surface of the chamber in a self-cleaning manner.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The apparatus of the present invention may be incorporated in any conventional molding machine, either of the extrusion, blower, or of the injection type, and since such machines are well known in the art, it will be unnecessary to disclose or describe a complete molding machine herein. Moreover, since the application of the present invention is the same with any of the conventional types, it will be unnecessary to illustrate all of them herein, and have accordingly chosen to illustrate the invention in connection with the extrusion type of machine, though without necessary or implied limitation thereto.

Figure 1:
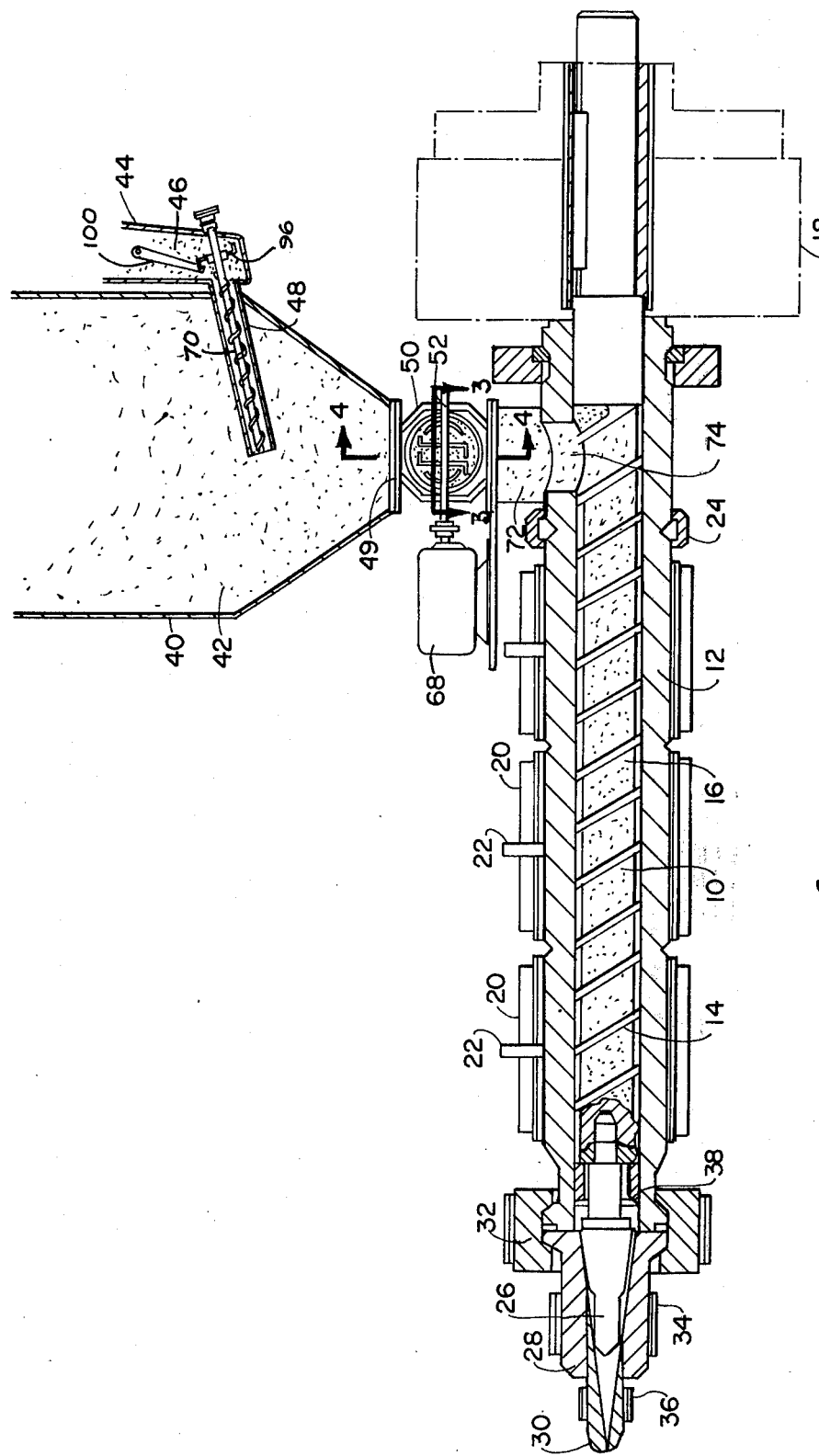
FIG. 1 is a sectional side elevational view of a molding machine showing only so much of a conventional molding machine as is necessary to illustrate the application thereto of the present invention.

Accordingly, FIG. 1 of the drawing shows in diagrammatic form only so much of a conventional molding machine as is necessary to illustrate the application thereto of the present invention.

Extrusion is a process for converting thermoplastics from raw granular or powdered resins to continuous lengths of finished products such as sheet, rod, pipe, or specialized profiles, or filament. Extruders accept powdered or granular pellets from a feed source, subject the material to heat and compression for complete melting and mixing, then pump the melt continuously through the extruder, where it is mechanically worked by a helically fluted rotating screw.

The most widely used extruder is the single-screw, constant-diameter machine such as shown in FIG. 1 wherein a single-screw extruder or conveyor 10 is provided within the extruder barrel 12. The screws for single-screw machines act as material conveyors and compressors, and usually have a single metal ridge or flight 14 wrapped like a large screw thread around a cylindrical root 16. The difference between screw outside diameter and the root is the flight depth or channel and melting takes place in the channel by friction (shear) heat and by externally introduced (conduction) heat. The extruder must be combined with downstream equipment to give the end product its final shape and length. This equipment generally falls into the categories of molds, dies, cooling units, haul-offs, and cutting units.

A drive for the extruder screw provides power to turn the screw within the desired speed ranges and to satisfy output requirements. The drive train consists of a motor (not shown) connected to a gear reduction box 18 into which the screw seats and which drives the screw for rotation in a conventional manner.

Heater bands 20 having thermocouple connections 32 encircle the barrel of the extruder for heating the materials being conveyed therein. To prevent premature melting of the material that causes bridging and feeding problems, the feed section of the barrel is provided with a water-cooled or air-cooled clamp member 24. The tip 26 of the screw is received in the extruder tip 28 through which the mixed materials exit the extruder through the nozzle 30. A heater band 32 serves to connect the extruder tip with the barrel and also to provide heat at this region to insure the mixed materials in their melt stage flow freely therethrough. Additional heater bands 34 and 36, which may be electrical or any other suitable type, encircle the extruder tip and the nozzle, respectively. A backpressure valve 38 is provided within the barrel for protecting against the excessive backpressure of melt material occurring within the barrel.

A main feed hopper 40 is provided for containing the primary material 42 to be mixed, such as a thermoplastic resinous material in plastic molding machines, and an auxiliary hopper 44 is provided for containing the additive material 46, such as a finer color powder or liquid concentrate, which is fed through conveyor tube 48 into the main feed hopper at the center thereof directly above the main feed hopper outlet or mixing chamber inlet 49.

As the additive material is conveyed into the center of the main feed hopper, the primary material and additive materials are fed together directly into the inlet 49 of a mixing chamber 50 within which the different materials are thoroughly blended and homogenized. A mixing assembly for achieving the blending and homogeniety rotates in the mixing chamber and includes a rotatable shaft 52 extending across the entire mixing chamber and through the walls thereof which carries a first ring element 54. A plurality of mixing arms 56 and 58 lie in the plane of the first ring element and are carried by the shaft being affixed thereto in any suitable manner, such as by welding and the like. The mixing arms 56 are generally squared Z-shaped and the mixing arms 58 are arcuate being curved toward the mixing arms 56. A second ring element 60 is carried on the shaft 52 and has a plane which intersects the plane of the first ring element passing through the axis of the shaft. In a preferred embodiment, the planes of the two ring members are normal to each other, however, other angular inclinations may also be utilized. A mixing arm 62 lies in the plane of the second ring element and is carried by the shaft extending outwardly therefrom, and has a general squared Z-shape. A pair of mixing arms 64 are spaced on each side of the mixing arms 62 also lie in the plane of the second ring member and are carried on the shaft 52 in a similar manner. Hence, the mixing arms 64, 62 and the mixing arms 56, 58, are carried in the planes of their respective ring elements, and are normal to each other. While this angular positioning of the mixing arm members is preferred, other angular orientations of the mixing arms with respect to the ring elements and each other may also be desirable. In one embodiment the ring elements are circular and are spaced symmetrically about the shaft.

Figure 4:
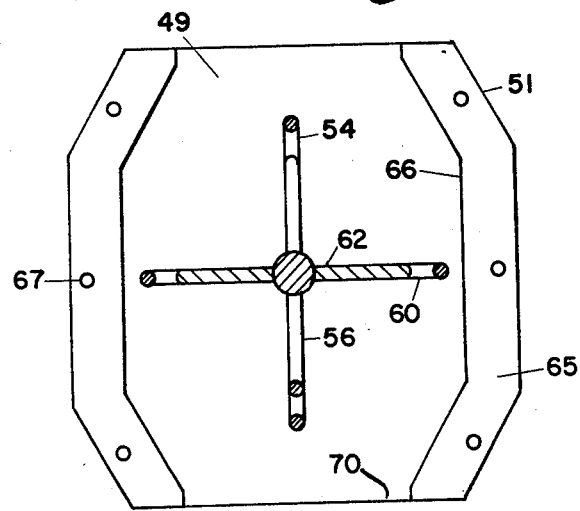
FIG. 4 is a view taken along the line 4—4 of FIG. 1.

The mixing chamber, as shown in FIG. 4 is constructed of two half sections 51 which are fastened together by bolts inserted through holes 67 located in outer flange member 65. In this manner, the mixing chamber may be readily disassembled for removal of the mixing assembly and servicing of parts. The mixing chamber, main feed hopper, and screw extruder feed inlet are operatively connected together in any conventional manner as by bolts and flange members.

The ring elements 54 and 60 are spaced closely adjacent to an interior surface 66 of the mixing chamber. In a preferred embodiment, the spacing is approximately 1/16 of an inch. The shaft 52 may be rotated by a conventional electric motor 68. As the shaft is rotated, the ring elements 54 and 60 sweep out a volume equal to that of their circular configuration. Due to the larger size of the primary granules, the larger granules will be lodged in the space between the ring elements and the interior wall and will agitate against the walls thus removing any of the finer additive therefrom. In this manner, the ring elements keep the interior surface of the mixing chamber clean and provide a movable wall within which the materials are mixed. The mixing and blending action of the mixing assembly thus described will be almost entirely confined within the volume defined by the ring elements. As the primary and additive materials feed into the mixing chamber, they are swept within the rotating ring elements and mixed therein by the mixer arms 56, 58, 62 and 64 until they flow through the outlet 70 of the mixing chamber through the channel 72 into the feed opening 74 of the extruder barrel and are then conveyed by the screw extruder 10. When the shaft and ring elements are rotating, the interior of the mixing chamber is constantly being self-cleaned by the abrasive action of the larger primary granules against the interior surface wall.

In the disclosed embodiment, the volume defined by the rotation of the ring elements is that of a sphere and is substantially equal to the volume of the mixing chamber providing thorough mixing therein. Some space of the mixing chamber must be left so to provide unimpaired entering and exiting of the materials.

Figure 2:
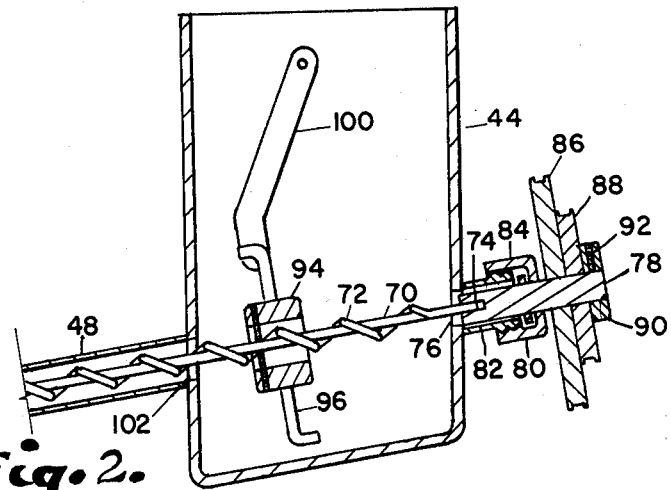
FIG. 2 is a sectional elevational view of the auxiliary hopper constructed in accordance with the present invention with parts of the molding machinery omitted.
Figure 3:
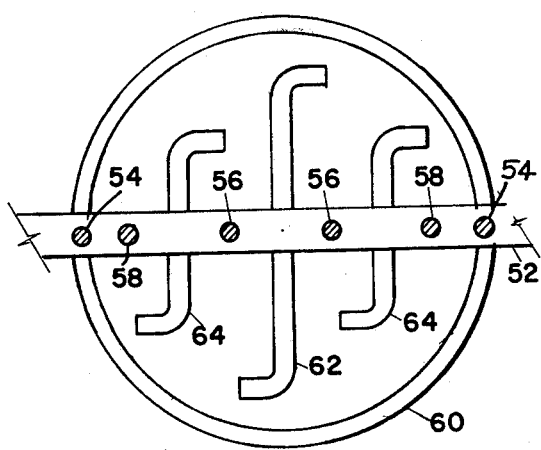
FIG. 3 is a view taken along line 3—3 of FIG. 1.
Figure 5:
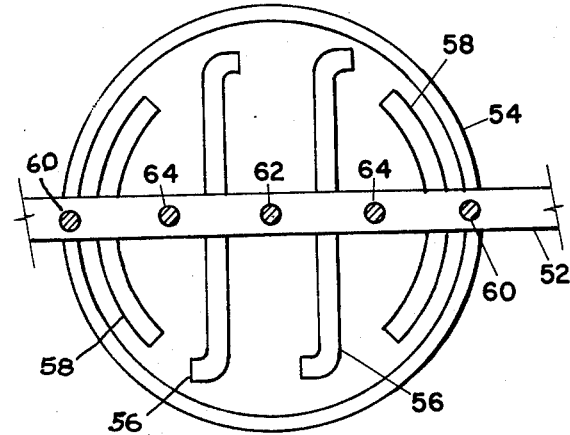
FIG. 5 is an enlarged view illustrating the mixing ring and arm apparatus of FIG. 1.

Referring now to FIG. 2, the auxiliary hopper 44 is provided with a conveyor member centrally located in the conveyor tube 48 which includes a rotatable rod 70 extending across the interior of the auxiliary hopper through the center of the conveyor tube, and a spiral member 72 carried on the rod for conveying the additive material from the auxiliary hopper to the main hopper through the conveyor tube. In a preferred embodiment, the spiral member comprises a stainless steel spring which is slightly stretched along and encircling the rod and is attached to the rod adjacent the ends thereof by any suitable method, as by welding. One end of the rod 74 extends through an opening 76 in one side of the auxiliary hopper and is fitted into one end of a short drive shaft 78 for rotation therewith. A threaded cap member 80 is received over a threaded coupling member 82 for engaging a circular flange 84 integral with the drive shaft for rotatably carrying the drive shaft in the sidewall of the auxiliary hopper. A variable drive pulley assembly including a large pulley 86, a smaller pulley 88, and a coupling 90 are fixed to the end of the drive shaft by tightening set screw 92 thereagainst. The pulley assembly drives the shaft 78 and thus the rod 70 at 90 or 120 RPM to vary the ratio of the color additive to the primary material. The pulley assembly may be driven off of the main drive for the extruder screw or a separate electric motor may be provided for driving the pulley assembly. Other variable speed drives may also be used in order to provide a variety of ratios for the additive material with respect to the primary material. The auxiliary hopper may be used to load and blend virgin and regrind material, or two different virgin materials in an adjustable volummetric ratio, as well as to load and feed color additives.

A collar member 94 is carried on the rod 70 for rotation therewith. A plurality of radially extending L-shaped arm members 96 are carried by the collar for striking a vibrator element 100 attached to the inside of the auxiliary hopper and protruding therefrom for agitating and vibrating the additive material within the hopper to prevent the additive material from packing in the hopper as fine powdered material has a tendency to do. As the activator arms 96 strike the vibrator element 100 when the hopper is empty a noise signal is provided to indicate the empty condition of the hopper.

Thus, it can be seen that an efficient and thorough mixing apparatus is provided for use in blending different materials together on molding machines and the like. The mixing chamber provides a thorough and homogeneous blending of the material while the mixing ring and arm elements combine to provide self-cleaning of the mixing chamber. While a preferred embodiment has shown a mixing chamber to be of a particular configuration, other configurations such as a spherical configuration may be used. Both the auxiliary hopper and the mixing apparatus of the present invention can be mounted on any existing molding machine with a main hopper. The auxiliary hopper constructed in accordance with the present invention, conveys the additive material to the center of the main hopper directly above the outlet to the mixing chamber and combines with the improved mixing apparatus of the present invention, to eliminate the problem of inaccurate coloring when mixing a coloring additive with an uncolored resinous granules. The blending action in the mixing chamber enhances the plasticizing of the material and enhances the transition of the materials into a continuous melt in the extruder screw to expedite the extruding process therein.

While a preferred embodiment of the invention has been described using specific terms, such description is for illustrative purposes only, and it is to be understood that changes and variations may be made without departing from the spirit or scope of the following claims.

What is claimed is:

1. For use in a molding machine and the like having a main feed hopper containing a primary molding material, an auxiliary hopper for feeding an additive material into said main hopper, a mixing chamber for mixing said primary material and said additive together having an inlet opening connected to said main hopper and an outlet opening connected to a tubular conveyor chamber for conveying mixed material away therefrom, said mixing chamber including a transverse rotatable shaft extending across said mixing chamber carried therein, a plurality of ring elements having intersecting planes carried by said shaft closely adjacent an interior surface of said mixing chamber for removing and cleaning said materials therefrom, each ring element being symmetric about said shaft, a plurality of outwardly extending mixing arms carried by said shaft for mixing the materials together within said ring elements.

2. The apparatus of claim 1 further comprising:
   a conveyor tube carried by said auxiliary hopper and extending into said main hopper terminating adjacent the center of said main hopper directly above said inlet opening, said conveyor tube having a conveyor member centrally located therein for conveying said additive material to the main hopper for direct flow into said mixing chamber together with said main material for mixing therein.

3. For use in a molding machine and the like having a main feed hopper containing a primary molding material, an auxiliary hopper for feeding an additive material to said main feed hopper, a mixing chamber for mixing said primary and additive materials together having an inlet opening connected to said main hopper and an outlet opening connected to a conveyor means for conveying the mixed materials away, the improvement comprising:
   a conveyor tube carried by said auxiliary hopper and extending into said main hopper terminating adjacent the center of said main hopper directly above said inlet opening, said conveyor tube having a conveyor member centrally located therein for conveying said additive material to the main hopper for direct flow into said mixing chamber together with said primary material for mixing therein, and
   a mixing assembly including a rotatable shaft extending across said mixing chamber, at least one ring element carried by said shaft closely adjacent an interior surface of said mixing chamber so as to remove and clean said materials therefrom, and a plurality of mixing arms carried by said shaft for mixing said materials together within said ring element.

4. The apparatus of claim 3 wherein said conveyor member located in said conveyor tube of said auxiliary hopper includes a rotatable rod extending across the interior of said auxiliary hopper through the center of said conveyor tube, and a spiral member carried on said rod for conveying said additive material from said auxiliary hopper to said main hopper.

5. The apparatus of claim 4 wherein said spiral member comprises a steel spring stretched along and encircling said rod attached adjacent the ends thereof.

6. The apparatus of claim 3 wherein said auxiliary hopper includes a vibrator element protruding from an interior wall, and an activator element carried by said conveyor member for activating said vibrator element to provide agitation to the additive material contained in said auxiliary hopper eliminating packing thereof.

7. The apparatus of claim 6 wherein said activator element activates said vibrator to provide a noise signal when said auxiliary hopper is empty to indicate the empty condition.

8. A mixing device for thoroughly mixing and blending materials together comprising:
- a mixing chamber having an inlet opening for receiving the materials to be mixed and an outlet opening for delivering the mixed materials out of the chamber,
- a rotatable shaft extending across said mixing chamber and carried therein,
- a first ring element symmetrically carried about said shaft closely adjacent an interior surface of said mixing chamber for removing and cleaning the materials therefrom having a plane normal to said shaft,
- a second ring element symmetrically carried about said shaft closely adjacent an interior surface of said mixing chamber for removing and cleaning the materials therefrom lying in a plane intersecting the plane of said first ring element,
- a plurality of mixing arms carried by said shaft extending outwardly therefrom for thoroughly mixing said materials together within a volume defined by said ring elements as said ring elements are rotated by said shaft within the mixing chamber.

9. The apparatus of claim 8 wherein the plane of said second ring element is normal to the plane of said first ring element, and said volume is substantially equal to the volume of the mixing chamber.

10. The apparatus of claim 9 wherein a plurality of said mixing arms carried by said shaft lie in the plane of said first ring element and a plurality of said mixing arms carried by said shaft lie in the plane of said second ring element.

* * * * *